United States Patent
Hardacker et al.

(10) Patent No.: US 8,610,834 B2
(45) Date of Patent: Dec. 17, 2013

(54) SYSTEM AND METHOD FOR EFFECTIVELY IMPLEMENTING A CHARGING BASE FOR A REMOTE CONTROL DEVICE

(75) Inventors: Robert Hardacker, Escondido, CA (US); Christopher Read, San Diego, CA (US); Brant Candelore, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1802 days.

(21) Appl. No.: 11/701,667

(22) Filed: Feb. 2, 2007

(65) Prior Publication Data

US 2008/0186410 A1    Aug. 7, 2008

(51) Int. Cl.
H04N 5/44    (2011.01)

(52) U.S. Cl.
USPC ........ 348/734; 348/730; 348/725; 348/211.6; 348/211.7; 725/39; 725/50; 725/81; 725/82; 725/117; 725/132; 725/140; 725/152; 725/147; 340/538.15

(58) Field of Classification Search
USPC ................. 348/734, 730, 725, 211.6, 211.7; 725/140, 132, 152, 39, 50, 81, 82, 117, 725/147; 361/679.41; 710/303, 304; 340/538.15
See application file for complete search history.

(56) References Cited

U.S. PATENT DOCUMENTS

| | | | | |
|---|---|---|---|---|
| 5,495,301 A | | 2/1996 | Mudra | |
| 5,625,608 A | * | 4/1997 | Grewe et al. | 369/24.01 |
| 5,835,733 A | * | 11/1998 | Walsh et al. | 710/303 |
| 5,991,839 A | * | 11/1999 | Ninomiya | 710/303 |
| 6,029,215 A | * | 2/2000 | Watts et al. | 710/303 |
| 6,126,332 A | * | 10/2000 | Cubbage et al. | 710/2 |
| 6,285,357 B1 | * | 9/2001 | Kushiro et al. | 345/169 |
| 6,445,290 B1 | * | 9/2002 | Fingal et al. | 340/539.32 |
| 6,476,825 B1 | | 11/2002 | Croy et al. | |
| 6,757,165 B2 | * | 6/2004 | Fujiki et al. | 361/679.41 |
| 7,038,906 B2 | * | 5/2006 | Hubbard | 361/679.09 |
| 7,479,762 B2 | * | 1/2009 | Bayne et al. | 320/132 |
| 7,817,035 B2 | * | 10/2010 | Hardacker et al. | 340/568.1 |
| 8,352,114 B2 | * | 1/2013 | More et al. | 701/26 |
| 2002/0190956 A1 | * | 12/2002 | Klein et al. | 345/169 |
| 2003/0109994 A1 | * | 6/2003 | Dubil et al. | 702/63 |
| 2004/0066308 A1 | * | 4/2004 | Sampsell | 340/825.69 |
| 2004/0150518 A1 | * | 8/2004 | Phillips et al. | 340/500 |
| 2004/0228622 A1 | * | 11/2004 | Schedivy | 386/125 |
| 2005/0046751 A1 | * | 3/2005 | Simmons | 348/734 |
| 2006/0022636 A1 | * | 2/2006 | Xian et al. | 320/108 |
| 2006/0109112 A1 | * | 5/2006 | Haines | 340/539.32 |
| 2006/0183505 A1 | * | 8/2006 | Willrich | 455/566 |
| 2007/0070181 A1 | * | 3/2007 | Oh et al. | 348/14.02 |
| 2007/0097274 A1 | * | 5/2007 | Pfiffer | 348/734 |
| 2007/0130399 A1 | * | 6/2007 | Anderson et al. | 710/62 |

\* cited by examiner

*Primary Examiner* — Jefferey Harold
*Assistant Examiner* — Mustafizur Rahman
(74) *Attorney, Agent, or Firm* — Sony Corporation

(57) ABSTRACT

A system and method for effectively implementing a charging base for a remote control includes a television device that is controlled by the remote control over a wireless RC-TV communications link. The charging base recharges a battery of the remote control when the remote control is docked to the charging base. In addition, the remote control may be docked to the charging base for bi-directionally communicating with the television and other external entities over a wireless base-TV communications link. Furthermore, various compatible peripheral devices may also recharge their batteries and bi-directionally communicate with the television and the external entities over the base-TV communications link while the peripheral devices are docked to the charging base.

43 Claims, 8 Drawing Sheets

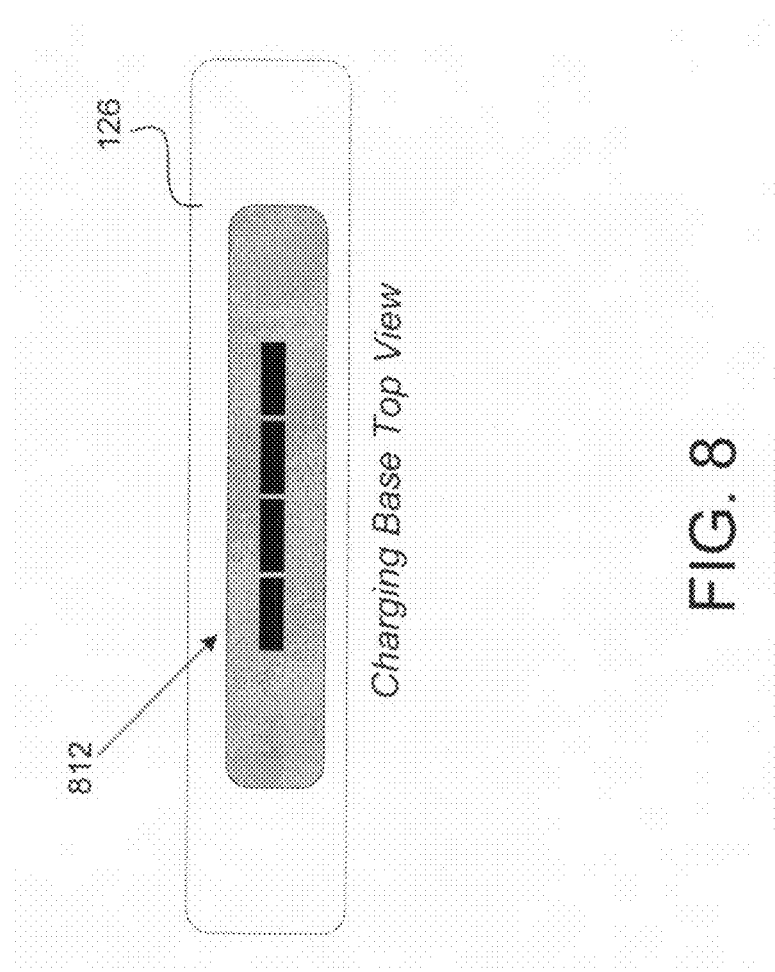

SYSTEM AND METHOD FOR EFFECTIVELY IMPLEMENTING A CHARGING BASE FOR A REMOTE CONTROL DEVICE

BACKGROUND SECTION

1. Field of the Invention

This invention relates generally to techniques for controlling electronic devices, and relates more particularly to a system and method for effectively implementing a charging base for a remote control device.

2. Description of the Background Art

Implementing effective methods for controlling electronic devices is a significant consideration for designers and manufacturers of contemporary electronic systems. However, effectively controlling electronic devices may create substantial challenges for system designers. For example, enhanced demands for increased control functionality and device performance may require more operating power and require additional hardware resources. An increase in power or hardware requirements may also result in a corresponding detrimental economic impact due to increased production costs and operational inefficiencies.

Furthermore, enhanced device capability to perform various advanced control operations may provide additional benefits to a system user, but may also place increased demands on the control and management of various system components. For example, an enhanced control system that effectively controls digital television systems may benefit from an efficient implementation because of the large amount and complexity of the digital data involved.

Due to growing demands on device control functionality and substantially increasing data magnitudes, it is apparent that developing new techniques for controlling electronic systems is a matter of concern for related electronic technologies. Therefore, for all the foregoing reasons, developing effective techniques for providing appropriate device-control functionality remains a significant consideration for designers, manufacturers, and users of contemporary electronic devices.

SUMMARY

In accordance with the present invention, a system and method are disclosed for effectively implementing a charging base for a remote control. In one embodiment, a television system includes the remote control (RC), a television (TV), the charging base, and at least one peripheral device. The remote control may bi-directionally and wirelessly communicate with the television via a remote control-television (RC-TV) communications link by utilizing any appropriate communication techniques. For example, the remote control may provide low-speed control information to the television by utilizing infrared transmission techniques. In addition, in certain embodiments, the remote control and the television may directly communicate with each other by utilizing appropriate low-speed or high-speed radio-frequency (RF) transmission techniques to transfer any desired types of electronic information.

In certain embodiments, the remote control may include a liquid-crystal display (LCD) or other types of displays (such as a surface-conduction electron-emitter display (SED) or an organic light-emitting diode (OLED) display) for presenting various types of visual information to a system user. Because of the relatively high power consumption of both the display and the RF transmissions of the remote control, the television system therefore advantageously provides the charging base for periodically docking and recharging the remote control to ensure uninterrupted control of the television system. The charging base is supplied with operating power through a local connection to a continuous alternating current (AC) power outlet, instead of through limited a direct current (DC) battery power source.

The charging base may bi-directionally and wirelessly communicate with the television through a base-TV communications link by utilizing any effective communication techniques. For example, the charging base and the television may directly communication with each other by utilizing appropriate high-speed radio-frequency transmission techniques or power line communication (PLC) techniques to transfer any desired types of electronic information. The charging base may include an RC dataport/charger interface for docking the remote control to perform appropriate remote-control recharging procedures. In addition, the RC dataport/charger interface may also be utilized for docking the remote control to upload or download any type of electronic information to or from the television (or other external entities) through the charging base and the base-TV communications link.

In addition, the charging base may also include at least one peripheral dataport/charger interface for docking peripheral devices to upload or download electronic information to or from the television (or other external entities) through the charging base and the base-TV communications link. In certain embodiments, the peripheral dataport/charger interface may also be utilized for docking peripheral devices to advantageously recharge the batteries of the corresponding peripheral devices to thereby renew their operating power resources.

In certain embodiments, the charging base may be implemented as a portable device that is flexibly positionable within the operating area of the television system. In accordance with the present invention, a system user of the television system may thus selectively position the charging base in a convenient location that is adjacent to at least one typical viewing location from which the system user views and otherwise utilizes the television system. The system user may then readily access the various functionalities of the charging base from the comfort and convenience of the system users' typical viewing location. For at least the foregoing reasons, the present invention therefore provides an improved system and method for effectively implementing a charging base for a remote control device.

BRIEF DESCRIPTION OF THE DRAWINGS

FIG. 8 is a top view of the charging base of FIG. 1, in accordance with one embodiment of the present invention.

DETAILED DESCRIPTION

The present invention relates to an improvement in remote control systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively implementing a charging base for a remote control, and includes a television device that is controlled by the remote control over a wireless RC-TV communications link. The charging base may recharge a battery of the remote control when the remote control is docked to the charging base. In addition, the remote control may be docked to the charging base for bi-directionally communicating with the television and other external entities over a wireless base-TV communications link. Furthermore, various compatible peripheral devices may also recharge their batteries and bi-directionally communicate with the television and other external entities over the base-TV communications link while the peripheral devices are docked to the charging base.

Figure 1:
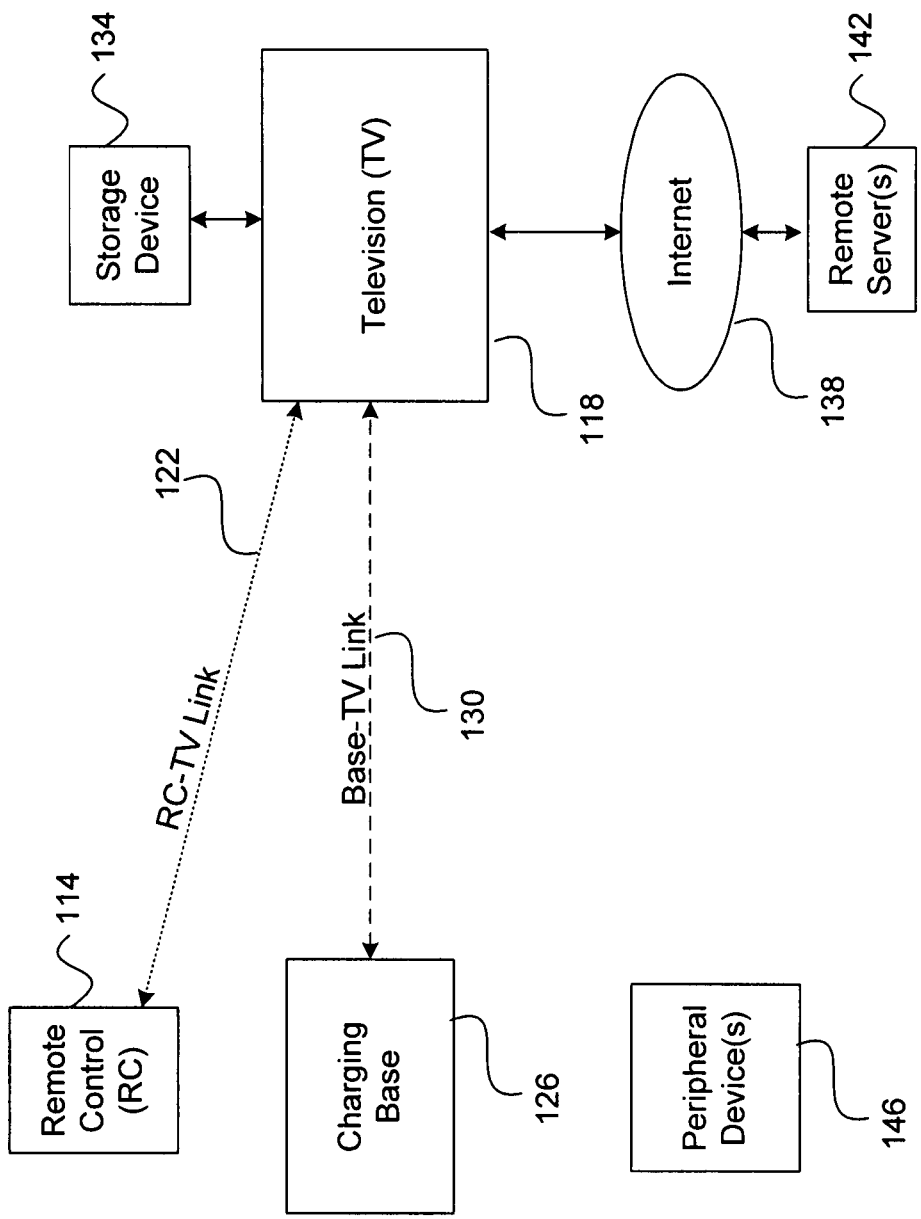
FIG. 1 is a block diagram of a television system, in accordance with one embodiment of the present invention.

Referring now to FIG. 1, a block diagram of a television system 110 is shown, in accordance with one embodiment of the present invention. In the FIG. 1 embodiment, television system 110 may include, but is not limited to, a remote control (RC) 114, a television (TV) 118, a charging base 126, a storage device 134, one or more remote servers 142, and one or more peripheral devices 146. In alternate embodiments, television system 110 may be implemented using components and configurations in addition to, or instead of, certain of those components and configurations discussed in conjunction with the FIG. 1 embodiment.

In the FIG. 1 embodiment, remote control 114 may bi-directionally and wirelessly communicate with television 118 via RC-TV link 122 by utilizing any appropriate communication techniques. For example, in certain embodiments, remote control 114 may provide low-speed control information to television 118 by utilizing infrared (IR) transmission techniques. In addition, in certain embodiments, remote control 114 and television 118 may directly communicate with each other over RC-TV link 122 by utilizing appropriate low-speed or high-speed radio-frequency (RF) transmission techniques to transfer any desired types of electronic information.

In the FIG. 1 embodiment of television system 110, remote control 114 may include a liquid-crystal display (LCD). Because of relatively high power consumption of both the LCD and the RF transmissions of remote control 114, television system 110 therefore advantageously incorporates charging base 126 for periodically docking and recharging remote control 114 to ensure uninterrupted control of television 118. In the FIG. 1 embodiment, charging base 126 is supplied with operating power through a local connection to a continuous AC power outlet, instead of through a limited DC battery power source.

In the FIG. 1 embodiment, charging base 126 may bi-directionally and wirelessly communicate with television 118 through a base-TV link 130 by utilizing any effective communication techniques. For example, in certain embodiments, charging base 126 and television 118 may directly communication with each other by utilizing appropriate high-speed radio-frequency (RF) transmission techniques to transfer any desired types of electronic information. In the FIG. 1 embodiment, charging base 126 may include an RC dataport/charger interface for docking remote control 114 to perform appropriate remote-control recharging procedures. In addition, the RC dataport/charger interface may also be utilized for docking remote control 114 to upload or download any type of electronic information to for from television 118 (or other external entities) through charging base 126 and base-TV link 130.

In addition, in the FIG. 1 embodiment, charging base 126 may also include at least one peripheral dataport/charger interface for docking one or more peripheral devices 146 to upload or download electronic information to or from television 118 (or other external entities) through charging base 126 and base-TV link 130. In certain embodiments, the peripheral dataport/charger interface may also be utilized for docking one or more peripheral devices 146 to advantageously recharge the batteries of the corresponding peripheral devices 146 to thereby renew their operating power sources.

In certain embodiments, charging base 126 may be implemented as a portable device that is flexibly positionable within the operating area of television system 110. In accordance with the present invention, a system user of television 118 may thus selectively locate charging base 126 in a convenient location that is adjacent to at least one typical viewing location from which the system user views and otherwise utilizes television system 110. The system user may then readily access the various functionalities of charging base 126 from the comfort and convenience of the system user's typical viewing location.

In the FIG. 1 embodiment, peripheral devices 146 may be implemented as any desired types of portable or non-portable electronic devices. For example, peripheral devices 146 may include, but are not limited to, various types of video cameras, digital still cameras, personal digital assistants (PDAs), portable audio player devices, cellular telephones, portable video players, and laptop computers. In the FIG. 1 embodiment, a peripheral device 146 may therefore utilize charging base 126 to upload any type of locally-stored electronic information or data through base-TV link 130 to television 118 or other external entities. For example, a digital camera may be docked to charging base 126 to upload recorded video information for display on television 118. Remote control 114 or other appropriate means may then be utilized to control the display of the uploaded video information on television 114.

In the FIG. 1 embodiment, television 118 is coupled to a storage device 134 that may be implemented as any desired type of electronic device. For example, storage device 134 may include, but is not limited to, a non-volatile memory device or a personal computer device. In addition, in the FIG. 1 embodiment, television 118 may be coupled through Internet 138 to one or more remote servers 142. Accordingly, a system user may utilize remote control 114 or other effective means to download any type of electronic information from television 114, storage device 134, or remote servers 142 through charging base 126 to either remote control 114 or peripheral devices 146. In addition, the system user may utilize remote control 114 or other means to upload any type of electronic information from either remote control 114 or peripheral devices 146 to television 114, storage device 134, or remote servers 142 through charging base 126.

For example, in certain embodiments, base-TV link 130 may be utilized to bi-directionally transfer any desired types of content information between charging base 126 and television 118. Examples of such content information may include, but are not limited to, entertainment programming, still images, video data, audio data, software programs, movies, computer graphics, text data, and Internet webpages. In addition, a system user may download current electronic program guide (EPG) information into remote control 114 through charging base 126 for viewing on remote control 114, instead of interrupting programming that is being currently displayed on television 118.

The FIG. 1 embodiment of the present invention is described in the context of television system 110. However, the concepts and principles of the present invention may be readily applied to any suitable type of electronic device or system that is remotely controllable. For example, in certain embodiments of the present invention, television 118 may alternately be implemented as a television set-top box, a sound reproduction system, a personal video recorder (PVR), a digital video disc (DVD) device, a computer device, or any other television-related technology that is controlled remotely. The implementation and utilization of the FIG. 1 television system 110 is further discussed below in conjunction with FIGS. 2-8.

Figure 2:
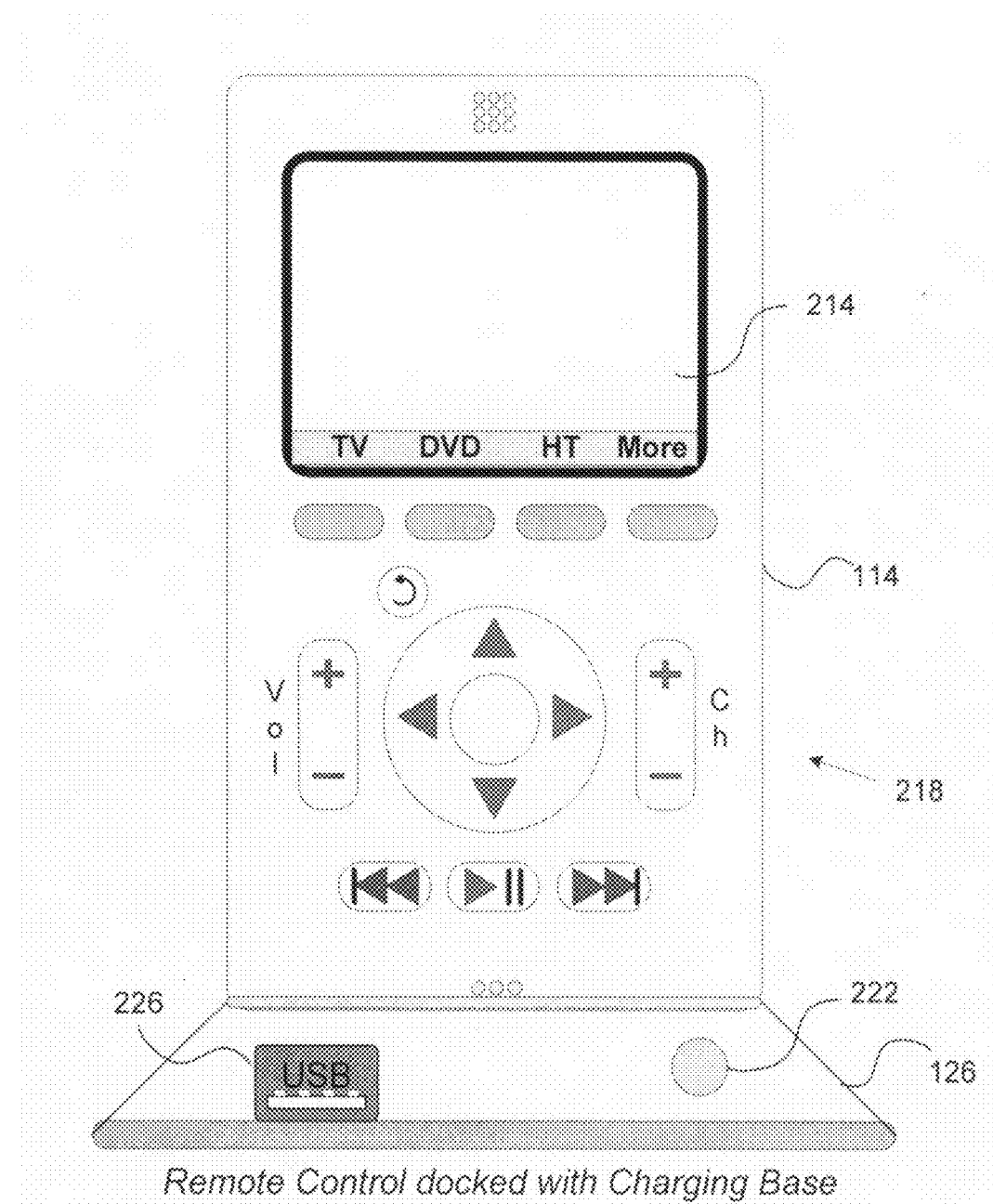
FIG. 2 is a diagram of the remote control and charging base of FIG. 1, in accordance with one embodiment of the present invention.

Referring now to FIG. 2, a diagram of the FIG. 1 remote control 114 and charging base 126 is shown, in accordance with one embodiment of the present invention. The FIG. 2 embodiment is presented for purposes of illustration, and in alternate embodiments, remote control 114 and charging base 126 may be implemented using components and configurations in addition to, or instead of, certain of those components and configurations discussed in conjunction with the FIG. 2 embodiment.

In the FIG. 2 embodiment, remote control 114 is shown as being docked (physically and electrically connected) to charging base 126. In the FIG. 2 embodiment, remote control 114 includes a display 214 and a control button array 218. In the FIG. 2 embodiment, charging base 126 includes a charging/charged indicator 222 to indicate whether the battery of a docked device is either partially or fully charged. In the FIG. 2 embodiment, charging base 126 also includes a USB connector 226 for docking one or more peripheral devices 146 (FIG. 1) to charging base 126. The implementation and utilization of charging base 126 are further discussed below in conjunction with FIGS. 7 and 8.

Figure 3:
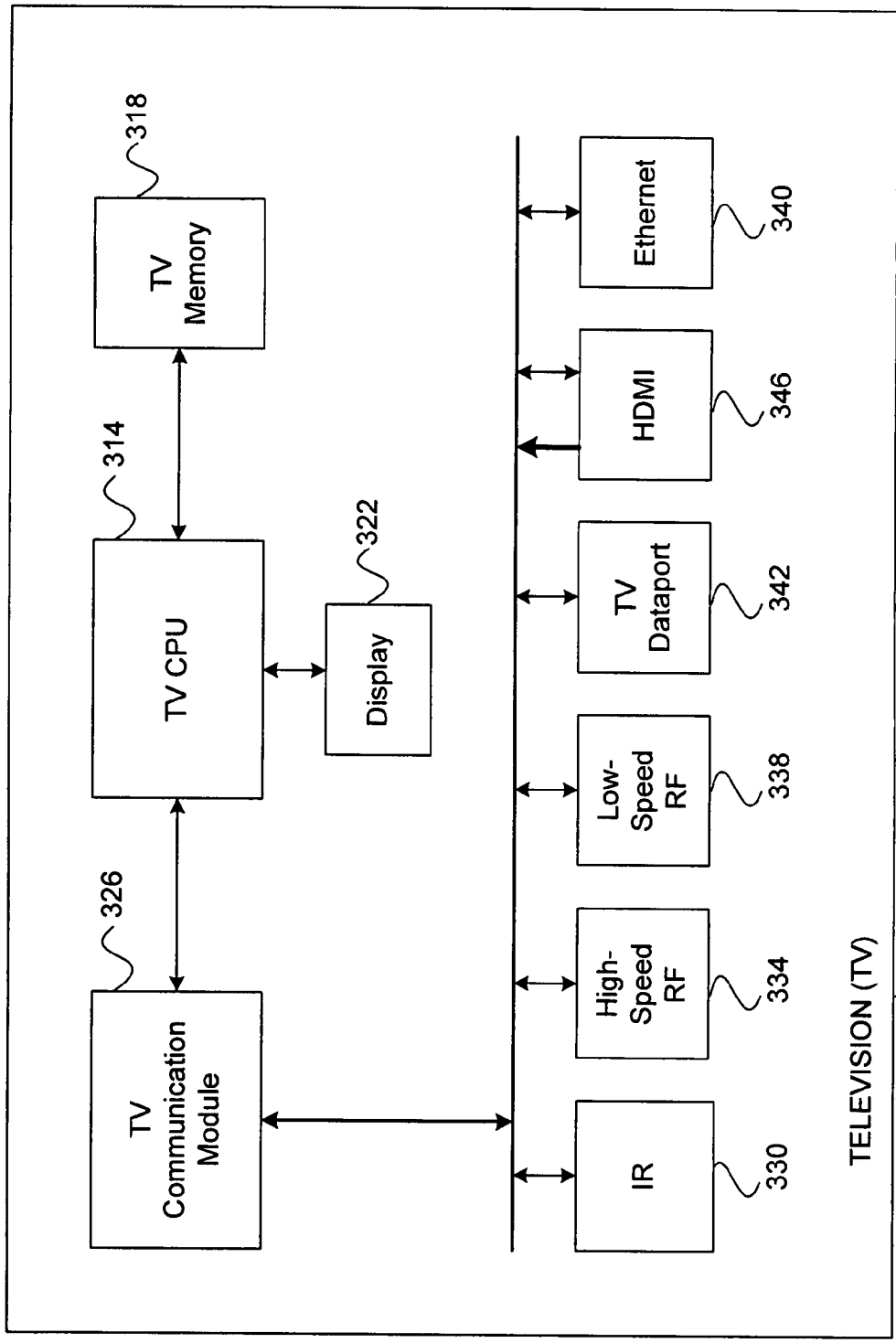
FIG. 3 is a block diagram for one embodiment of the television of FIG. 1, in accordance with the present invention.

Referring now to FIG. 3, a block diagram for one embodiment of the FIG. 1 television 118 is shown, in accordance with the present invention. In alternate embodiments, television 118 may include components and configurations in addition to, or instead of, certain of those components and configurations discussed in conjunction with the FIG. 3 embodiment.

In the FIG. 3 embodiment, television 118 includes a TV central processing unit (TV CPU) 314 that may be implemented to include any appropriate and compatible microprocessor device (including system-on-chip (SOC) architectures). In the FIG. 3 embodiment, TV CPU 314 preferably executes software instructions from one or more applications programs to thereby control and manage the operation of television 118. In the FIG. 3 embodiment, TV memory 318 may be implemented to include any combination of desired storage devices, including, but not limited to, read-only memory (ROM), random-access memory (RAM), and various types of non-volatile memory, such as floppy disks or hard disks.

In the FIG. 3 embodiment, TV memory 318 stores one or more application programs and other software modules that include program instructions that are executed by TV CPU 314 to perform various functions and operations for television 118. The particular nature and functionality of application programs typically varies depending upon factors such as the specific type and particular functionality of the corresponding television 118. In the FIG. 3 embodiment, TV memory 318 may also store a TV operating system that controls and coordinates low-level functionality of television 118. In the FIG. 3 embodiment, display 322 may be implemented in any effective manner to display appropriate visual information for television 118.

In the FIG. 3 embodiment, television 118 includes a TV communication module 326 that cooperates with TV CPU 314 to perform and coordinate various types of bi-directional wireless and wired communications between television 118 and other entities. The FIG. 3 embodiment also includes a series of TV input/output interfaces that TV communication module 326 may utilize to receive and/or transmit any required types of information. For example, in the FIG. 3 embodiment, the TV input/output interfaces include, but are not limited to, an infrared (IR) interface 330, a high-speed radio frequency (RF) interface 334, a low-speed RF interface 338, a TV dataport interface 342, a High-Definition Multimedia Interface (HDMI) 346, and an Ethernet interface 340.

In the FIG. 3 embodiment, TV communication module 326 may utilize IR interface 330 to receive control information and other appropriate information from remote control 114 (FIG. 1) by utilizing any effective infrared transmission techniques. In certain embodiments, IR interface 330 may also transmit infrared information to remote control 114. In the FIG. 3 embodiment, TV communication module 326 may utilize high-speed RF interface 334 to bi-directionally and wirelessly communicate with charging base 126 (FIG. 1) by utilizing any effective RF transmission techniques at any appropriate frequencies. For example, in the FIG. 3 embodiment, the high-speed RF transmissions may operate in the approximate range of 100 megabits-per-second. In certain embodiments, TV communication module 326 may also utilize high-speed RF interface 334 to bi-directionally communicate directly with remote control 114 depending upon factors such as implementation costs, power consumption, and type of communications (with higher speeds requiring more power and costing more, while providing greater throughput for large amounts of data (such as image data).

In the FIG. 3 embodiment, TV communication module 326 may utilize low-speed RF interface 338 to bi-directionally and wirelessly communicate with remote control 114 by utilizing any effective RF transmission techniques at any appropriate frequencies. In the FIG. 3 embodiment, TV communication module 326 may utilize TV dataport interface 342 to bi-directionally communicate with charging base 126 by utilizing any effective high-speed data transfer techniques at any appropriate frequencies. TV dataport interface 342 may be implemented by utilizing any desired data transfer configurations, formats, or protocols. For example, in certain embodiments, TV dataport interface 342 may be implemented in accordance with a known Universal Serial Bus (USB) standard to support flexible utilization by other devices with similar configurations.

In the FIG. 3 embodiment, TV communication module 326 may utilize HDMI 346 to effective perform various data transfer operations for receiving digital audio and video data. In the FIG. 3 embodiment, TV communication module 326 may utilize Ethernet interface 340 to perform any compatible network data transfer procedures to any appropriate types of distributed computer networks, including, but not limited to, the Internet. The implementation and utilization of television 118 are further discussed below in conjunction with FIGS. 4 through 8.

Figure 4:
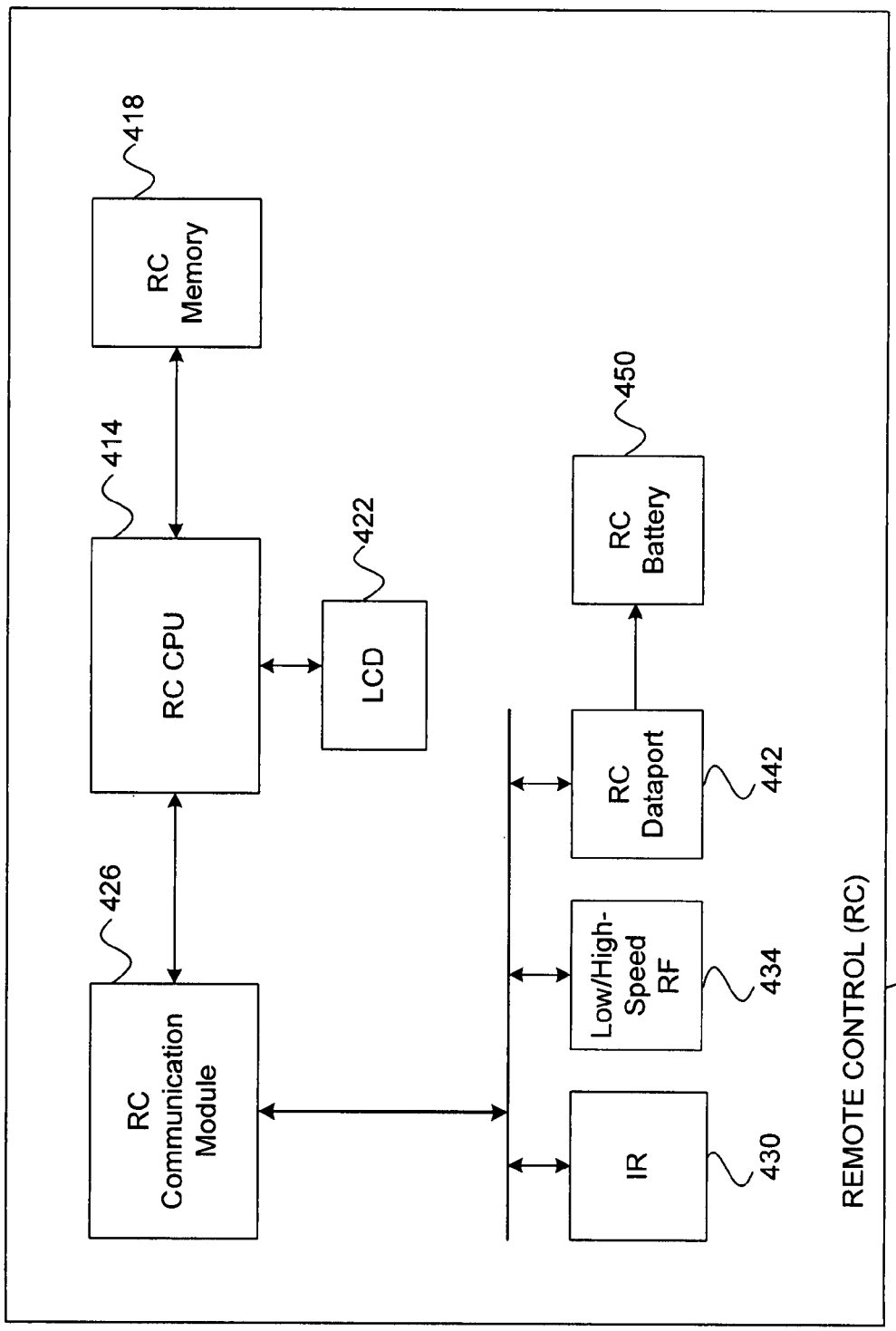
FIG. 4 is a block diagram for one embodiment of the remote control of FIG. 1, in accordance with the present invention.

Referring now to FIG. 4, a block diagram for one embodiment of the FIG. 1 remote control (RC) 114 is shown, in accordance with the present invention. In alternate embodiments, remote control 114 may include components and configurations in addition to, or instead of, certain of those components and configurations discussed in conjunction with the FIG. 4 embodiment.

In the FIG. 4 embodiment, remote control 114 includes a remote control central processing unit (RC CPU) 414 that may be implemented to include any appropriate and compatible microprocessor device. In the FIG. 4 embodiment, RC CPU 414 preferably executes software instructions from one or more applications programs to thereby control and manage the operation of remote control 114. In the FIG. 4 embodiment, RC memory 418 may be implemented to include any combination of desired storage devices, including, but not limited to, read-only memory (ROM), random-access memory (RAM), and various types of non-volatile memory.

In the FIG. 4 embodiment, RC memory 418 stores one or more application programs and other software modules that include program instructions that are executed by RC CPU 414 to perform various functions and operations for remote control 114. The particular nature and functionality of application programs typically varies depending upon factors such as the specific type and particular functionality of the corresponding remote control 114. In the FIG. 4 embodiment, RC memory 418 may also store an RC operating system that controls and coordinates low-level functionality of remote control 114. In the FIG. 4 embodiment, LCD 422 may be implemented in any effective manner to display appropriate visual information on remote control 114.

In the FIG. 4 embodiment, remote control 114 includes an RC communication module 426 that cooperates with RC CPU 414 to perform and coordinate various types of bi-directional wireless and wired communications between remote control 114 and other entities. The FIG. 4 embodiment also includes a series of RC input/output interfaces that RC communication module 426 may utilize to receive and/or transmit any required types of information. For example, in the FIG. 4 embodiment, the RC input/output interfaces include, but are not limited to, an infrared (IR) interface 430, a low/high-speed radio frequency (RF) interface 434, and an RC dataport interface 442.

In the FIG. 4 embodiment, RC communication module 426 may utilize IR interface 430 to send control information and other appropriate information directly to television 118 (FIG. 1) by utilizing any effective infrared transmission techniques. In certain embodiments, IR interface 330 may also receive infrared information from television 118 or other external entities. In the FIG. 4 embodiment, RC communication module 426 may utilize low/high-speed RF interface 434 to bi-directionally and wirelessly communicate with television 118 by utilizing any effective RF transmission techniques at any appropriate low or high RF frequencies.

In the FIG. 4 embodiment, RC communication module 426 may utilize RC dataport interface 442 to dock remote control 114 (FIG. 1) and bi-directionally communicate with television 114 or other entities by utilizing any effective high-speed data transfer techniques at any appropriate frequencies. RC dataport interface 442 may be implemented by utilizing any desired data transfer configurations, formats, or protocols. For example, in certain embodiments, RC dataport interface 442 may be implemented in accordance with a known Universal Serial Bus (USB) standard to support flexible utilization in conjunction with other devices having similar configurations.

In the FIG. 4 embodiment, remote control 114 may include a rechargeable RC battery 450 that may advantageously be recharged by charging base 126 (FIG. 1) through RC dataport interface 442 when remote control 114 is docked to charging base 126. The effective support and utilization of remote control 114 are further discussed below in conjunction with FIGS. 7-8.

Figure 5:
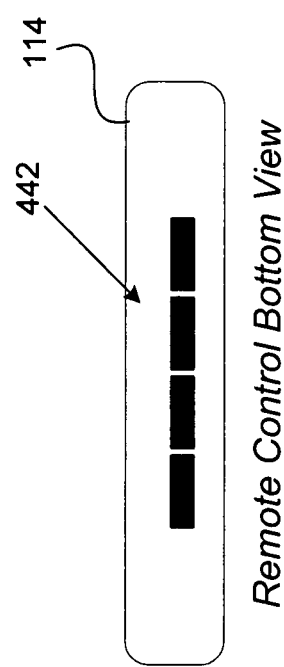
FIG. 5 is a bottom view of the remote control of FIG. 1, in accordance with one embodiment of the present invention.

Referring now to FIG. 5, a bottom view of the FIG. 1 remote control 114 is shown, in accordance with the present invention. The FIG. 5 embodiment is presented for purposes of illustration, and in alternate embodiments, remote control 114 may be implemented using components and configurations in addition to, or instead of, certain of those components and configurations discussed in conjunction with the FIG. 5 embodiment.

In the FIG. 5 embodiment, remote control 114 includes an RC dataport 442 for physically and electrically coupling remote control 114 to charging base 126. Remote control 114 may then bi-directionally communicate with television 118 through charging base 126 via RC dataport 442. In addition, charging base 126 may recharge an RC battery 450 (FIG. 4) of remote control 114 to thereby replenish operating power for remote control 114.

In the FIG. 5 embodiment, RC dataport 442 may be implemented according to any desired data transfer and/or battery charging configurations, formats, or protocols. For example, in certain embodiments, RC dataport 442 may be implemented in accordance with a known Universal Serial Bus (USB) standard to support flexible utilization by other devices with similar configurations. The FIG. 5 embodiment is shown with four connection pins, however, in certain alternate embodiments, various other numbers of connection pins are also contemplated.

In addition, RC dataport 442 may be implemented with a standard connector configuration to facilitate interchangeability and compatibility with various types of electronic devices. Alternately, RC dataport 442 may utilize a non-standard connector configuration in which the connection pins are large, robust, and spaced from each other to prevent misalignment problems. In addition, in certain embodiments, the connection pins may be spring-loaded to ensure optimal electrical contact. The effective utilization of remote control 114 is further discussed below in conjunction with FIGS. 7-8.

Figure 6:
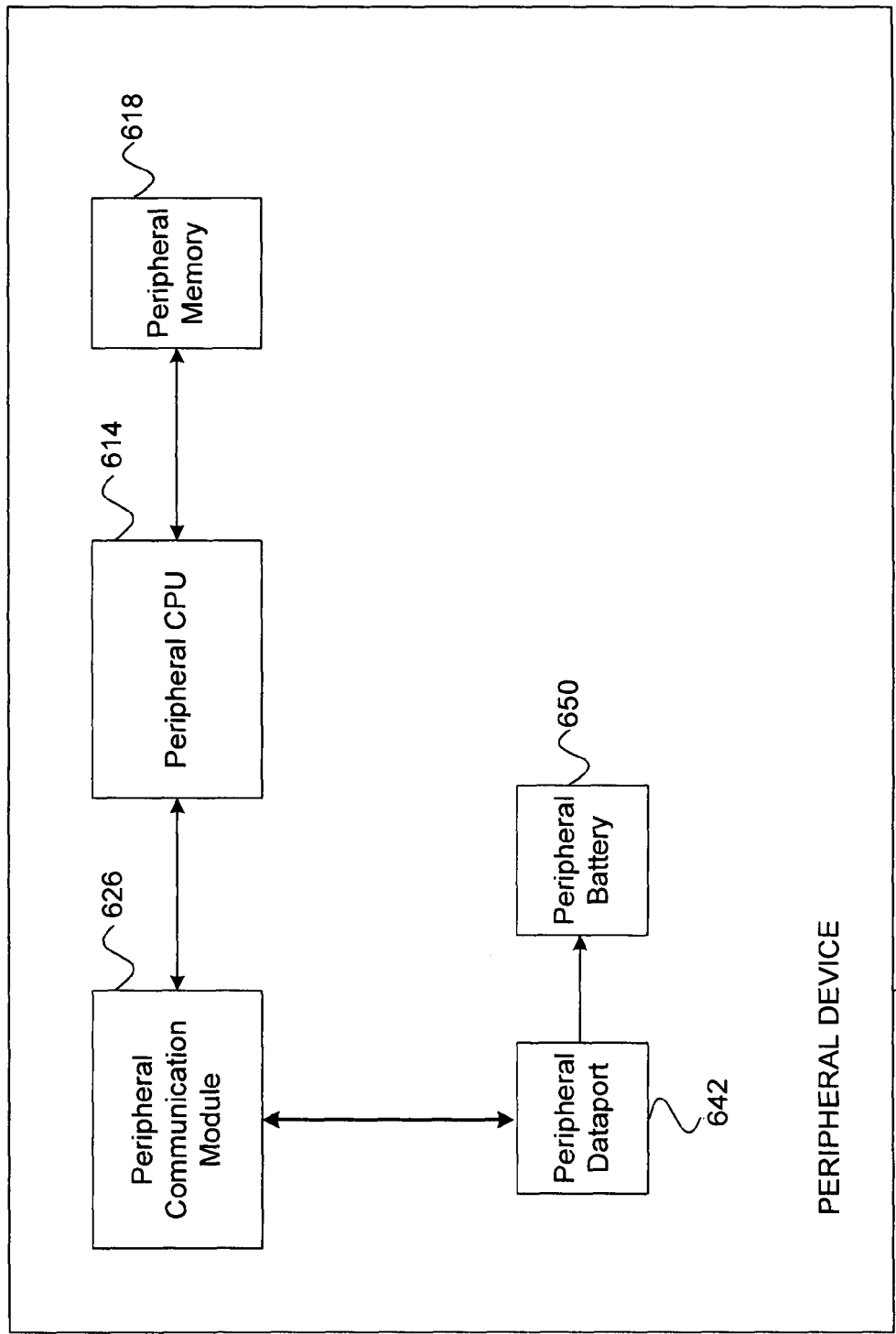
FIG. 6 is a block diagram for one embodiment of an exemplary peripheral device of FIG. 1, in accordance with the present invention.

Referring now to FIG. 6, a block diagram for one embodiment of an exemplary peripheral device 146 from FIG. 1 is shown, in accordance with the present invention. The FIG. 6 peripheral device 146 is presented for purposes of illustration, and in alternate embodiments, peripheral devices 146 may include components and configurations in addition to, or instead of, certain of those components and configurations discussed in conjunction with the FIG. 6 embodiment.

In the FIG. 6 embodiment, peripheral device 146 includes a peripheral central processing unit (peripheral CPU) 614 that may be implemented to include any appropriate and compatible microprocessor device. In the FIG. 6 embodiment, peripheral CPU 614 preferably executes software instructions from one or more applications programs to thereby control and manage the operation of peripheral device 146. In the FIG. 6 embodiment, peripheral memory 618 may be implemented to include any combination of desired storage devices, including, but not limited to, read-only memory (ROM), random-access memory (RAM), and various types of non-volatile memory, such as hard disk drives.

In the FIG. 6 embodiment, peripheral memory 618 stores one or more application programs and other software modules that include program instructions that are executed by peripheral CPU 614 to perform various functions and operations for peripheral device 146. The particular nature and functionality of application programs typically varies depending upon factors such as the specific type and particular functionality of the corresponding peripheral device 146. In the FIG. 6 embodiment, peripheral memory 618 may also store a device operating system that controls and coordinates low-level functionality of peripheral device 146.

In the FIG. 6 embodiment, peripheral device 146 includes a peripheral communication module 626 that cooperates with peripheral CPU 614 to perform and coordinate various types of bi-directional communications between peripheral device and other entities. The FIG. 6 embodiment also includes a peripheral dataport interface 642 that peripheral communication module 626 may utilize to receive and/or send any required types of electronic information. For example, in the FIG. 6 embodiment, peripheral communication module 626 may utilize peripheral dataport interface 642 to dock and bi-directionally communicate with charging base 126 (FIG. 1) by utilizing any effective high-speed data transfer techniques at any appropriate frequencies.

Peripheral dataport interface 642 may be implemented by utilizing any desired data transfer configurations, formats, or protocols. For example, in certain embodiments, peripheral dataport interface 642 may be implemented in accordance with a known Universal Serial Bus (USB) standard to support flexible utilization in conjunction with other devices having similar configurations. In the FIG. 6 embodiment, peripheral device 146 may include a rechargeable peripheral battery 650 that may advantageously be recharged by charging base 126 through peripheral dataport interface 642 when peripheral device 146 is docked with charging base 126. The utilization of charging base 126 to support peripheral device 146 is further discussed below in conjunction with FIGS. 7-8.

Figure 7:
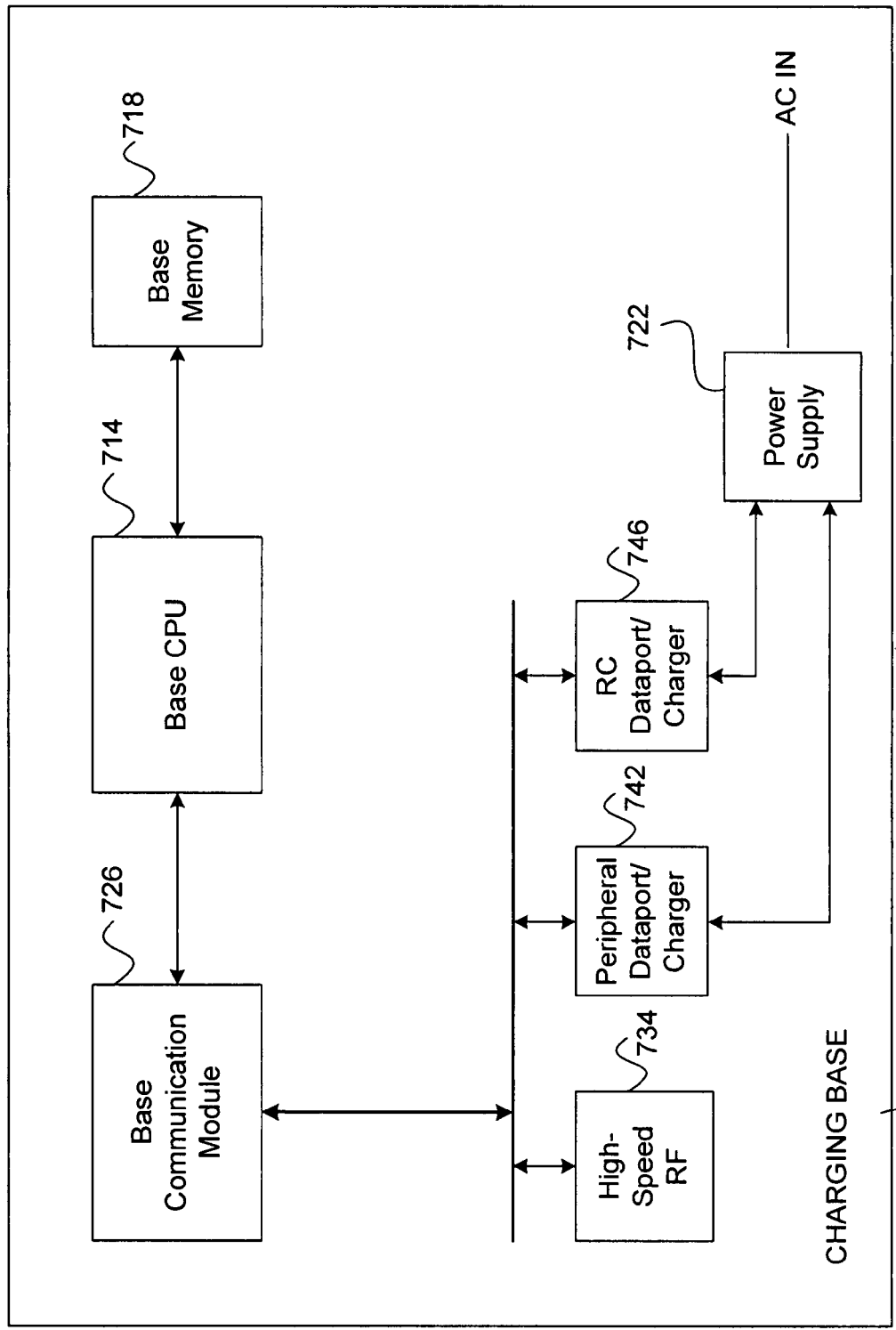
FIG. 7 is a block diagram for one embodiment of the charging base of FIG. 1, in accordance with the present invention.

Referring now to FIG. 7, a block diagram for one embodiment of the FIG. 1 charging base 126 is shown, in accordance with the present invention. In alternate embodiments, charging base 126 may include components and configurations in addition to, or instead of, certain of those components and configurations discussed in conjunction with the FIG. 7 embodiment.

In the FIG. 7 embodiment, charging base 126 includes a base central processing unit (base CPU) 714 that may be implemented to include any appropriate and compatible microprocessor device. In the FIG. 7 embodiment, base CPU 714 preferably executes software instructions from one or more applications programs to thereby control and manage the operation of charging base 126. In the FIG. 7 embodiment, base memory 718 may be implemented to include any combination of desired storage devices, including, but not limited to, read-only memory (ROM), random-access memory (RAM), and various types of non-volatile memory.

In the FIG. 7 embodiment, base memory 718 stores one or more application programs and other software modules that include program instructions that are executed by base CPU 714 to perform various functions and operations for charging base 126. The particular nature and functionality of application programs typically varies depending upon factors such as the specific type and functionality of the corresponding charging base 126. In the FIG. 7 embodiment, base memory 718 may also store a base operating system that controls and coordinates low-level functionality of charging base 126.

In the FIG. 7 embodiment, charging base 126 includes a base communication module 726 that cooperates with base CPU 714 to perform and coordinate various types of bi-directional wireless and/or wired communications between charging base 126 and other entities. The FIG. 7 embodiment also includes a series of base input/output interfaces that base communication module 726 may utilize to receive and/or transmit any required types of information. For example, in the FIG. 7 embodiment, the base input/output interfaces include, but are not limited to, a high-speed radio frequency (RF) interface 734, a peripheral dataport/charger interface 742, and an RC dataport/charger interface 746.

In the FIG. 7 embodiment, base communication module 726 may utilize high-speed RF interface 734 to bi-directionally and wirelessly communicate with television 118 or other external entities by utilizing any effective RF transmission techniques at any appropriate RF frequencies. For example, in the FIG. 7 embodiment, the high-speed RF transmissions may operate in the approximate range of 100 megabits-per-second. Furthermore, in the FIG. 7 embodiment, base communication module 726 may utilize peripheral dataport/charger interface 742 to bi-directionally communicate with a docked peripheral device 146 (FIG. 6) by utilizing any effective high-speed data transfer techniques at any appropriate frequencies. Peripheral dataport/charger interface 742 may be implemented by utilizing any desired data transfer configurations, formats, or protocols.

For example, in certain embodiments, peripheral dataport/charger interface 742 may be implemented in accordance with a known Universal Serial Bus (USB) standard to support flexible utilization by other devices with similar configurations. In the FIG. 7 embodiment, a power supply 722 of charging base 126 may be connected to a continuous AC power source (AC IN) for providing a peripheral recharging power source to peripheral dataport/charger interface 742 to thereby recharge a peripheral battery 650 (FIG. 6) of a docked peripheral device 146.

In addition, in the FIG. 7 embodiment, base communication module 726 may utilize RC dataport/charger interface 746 to bi-directionally communicate with a docked remote control 114 (FIG. 4) by utilizing any effective high-speed data transfer techniques at any appropriate frequencies. RC dataport/charger interface 746 may be implemented by utilizing any desired data transfer configurations, formats, or protocols. For example, in certain embodiments, RC dataport interface 446 may be implemented in accordance with a known Universal Serial Bus (USB) standard to support flexible utilization by other devices with similar configurations. In addition, in certain embodiments of charging base 126, power supply 722 of charging base 126 may provide an RC recharging power source to RC dataport/charger interface 746 to thereby advantageously recharge an RC battery 450 (FIG. 4) of a docked remote control 114. One exemplary embodiment for implementing charging base 126 is further discussed below in conjunction with FIG. 8.

Referring now to FIG. 8, a top view of the FIG. 1 charging base 126 is shown, in accordance with the present invention. The FIG. 8 embodiment is presented for purposes of illustration, and in alternate embodiments, charging base 126 may be implemented using components and configurations in addition to, or instead of, certain of those components and configurations discussed in conjunction with the FIG. 8 embodiment.

In the FIG. 8 embodiment, charging base 126 includes a base docking connector 812 for physically and electrically coupling remote control 114 to charging base 126. Remote control 114 may then bi-directionally communicate with television 118 through charging base 126 via base docking connector 812. In addition, charging base 126 may recharge an RC battery 450 (FIG. 4) of remote control 114 to thereby replenish operating power for remote control 114.

In the FIG. 8 embodiment, base docking connector 812 may be implemented according to any desired data transfer and/or battery charging configurations, formats, or protocols. For example, in certain embodiments, base docking connector 812 may be implemented in accordance with a known Universal Serial Bus (USB) standard to support flexible utilization by other devices with similar configurations. The FIG. 8 embodiment is shown with four connection pins, however, in certain alternate embodiments, various other numbers of connection pins are also contemplated.

In addition, base docking connector 812 may be implemented with a standard connector configuration to facilitate interchangeability and compatibility with various types of electronic devices. Alternately, base docking connector 812 may utilize a non-standard connector configuration in which the connection pins are large, robust, and spaced from each other to prevent misalignment problems. In addition, in certain embodiments, the connection pins may be spring-loaded to ensure optimal electrical contact.

In accordance with the present invention, charging base 126 therefore effectively provides a high-speed wireless communication path between either remote control 114 or peripheral devices 146 and television 118. In addition, charging base 126 also provides a convenient method for recharging either remote control 114 or peripheral devices 146 by coupling those devices to charging base 126. For at least the foregoing reasons, the present invention thus provides an improved system and method for effectively implementing a charging base for a remote control device.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for controlling an electronic system, the system comprising:
   a remote control operable to control operations of a television (TV) over a communication link; and
   a charging base operable to generate a recharge power source to recharge a battery of said remote control when said remote control is docked to said charging base,
   wherein said charging base is operable to serve as a communication interface for one or more peripheral devices to bi-directionally communicate with said television over a wireless base-TV communication link when said one or more peripheral devices are physically docked to said charging base, and
   wherein said wireless base-TV communication link allows said charging base to be freely positioned with respect to said television.

2. The system of claim 1, wherein said communication link comprises a wireless infrared communication path between said remote control and said television.

3. The system of claim 1, wherein said communication link comprises a wireless radio frequency communication path between said remote control and said television.

4. The system of claim 1, wherein said remote control docks to said charging base through a dataport/charger interface.

5. The system of claim 4, wherein said remote control bi-directionally communicates with said television over said wireless communication link while said remote control is docked to said charging base through said dataport/charger interface, wherein said recharge power source is provided to said battery through said dataport/charger interface when said remote control is docked to said charging base.

6. The system of claim 4, wherein said dataport/charger interface is implemented according to a Universal Serial Bus standard to facilitate compatibility with other electronic devices.

7. The system of claim 1, wherein said remote control downloads electronic information over said wireless communication link, through said charging base, from one or more of: said television, a remote storage device, and an Internet server.

8. The system of claim 7, wherein said electronic information comprises electronic program guide information that is displayed on a display of said remote control.

9. The system of claim 1, wherein said wireless communication link operates using high-speed wireless radio-frequency transmission techniques.

10. The system of claim 9, wherein said wireless communication link operates using said high-speed wireless radio-frequency transmission techniques in frequency range of 100 megabits-per-second.

11. The system of claim 1, wherein said charging base is a portable device freely positioned within an operating location of said television,
    wherein a system user selectively locates said charging base adjacent to a customary viewing location of said television to utilize said charging base without leaving said customary viewing location.

12. The system of claim 1, wherein said peripheral devices are operable to bi-directionally communicate with said television and other external entities over said wireless base-TV communication link while said peripheral devices are docked to said charging base.

13. The system of claim 12, wherein said peripheral devices comprise one or more of: a video camera, a digital still camera, a personal computer device, a personal digital assistant, an audio player, and a cellular telephone.

14. The system of claim 12, wherein said charging base is coupled to an AC power source to provide a continuous source of recharging power for recharging said remote control and said peripheral devices.

15. The system of claim 12, wherein said charging base comprises a peripheral dataport/charger interface for docking said peripheral devices to said charging base, wherein a dataport/charger interface for said peripheral devices is implemented according to a Universal Serial Bus standard to facilitate compatibility with other electronic devices.

16. The system of claim 15, wherein a peripheral recharge power source is provided to recharge peripheral batteries of said peripheral devices through said peripheral dataport/charger interface when said peripheral devices are docked to said charging base.

17. The system of claim 12, wherein said peripheral devices upload content information to said television, a remote storage device, and an Internet server over said wireless base-TV communication link when coupled to said charging base.

18. The system of claim 12, wherein said peripheral devices download content information from said television, a remote storage device, and an Internet server over said wireless base-TV communication link when coupled to said charging base.

19. The system of claim 12, wherein said peripheral devices upload and download content information to and from said television, a remote storage device, and an Internet server over said wireless base-TV communication link when coupled to said charging base, wherein said content information comprises entertainment programming, video data, still image data, text data, software program instructions, graphics, movies, and electronic program guides.

20. A method for controlling an electronic system, the method comprising:
controlling operations of a television (TV) over communication link using a remote control; and
generating a recharge power source from a charging base to recharge battery of said remote control when said remote control is docked to said charging base,
wherein said charging base is operable to serve as a communication interface for one or more peripheral devices to bi-directionally communicate with said television over a wireless base-TV communication link when said one or more peripheral devices are physically docked to said charging base,
wherein said wireless base-TV communication link allows said charging base to be freely positioned with respect to said television.

21. The method of claim 20, wherein said communication link comprises a wireless infrared communication path between said remote control and said television.

22. The method of claim 20, wherein said communication link comprises a wireless radio frequency communication path between said remote control and said television.

23. The method of claim 20, wherein said remote control docks to said charging base through dataport/charger interface.

24. The method of claim 23, wherein said remote control bi-directionally communicates with said television over said wireless communication link while said remote control is docked to said charging base through said dataport/charger interface, wherein said recharge power source is provided to said battery through said dataport/charger interface when said remote control is docked to said charging base.

25. The method of claim 23, wherein said dataport/charger interface is implemented according to a Universal Serial Bus standard to facilitate compatibility with other electronic devices.

26. The method of claim 20, wherein said remote control downloads electronic information over said wireless base-TV communication link, through said charging base, from one or more of: said television, a remote storage device, and an Internet server.

27. The method of claim 26, wherein said electronic information comprises electronic program guide information that is displayed on a display of said remote control.

28. The method of claim 20, wherein said wireless communication link operates using high-speed wireless radio-frequency transmission techniques.

29. The method of claim 28, wherein said wireless communication link operates using said high-speed wireless radio-frequency transmission techniques in a frequency range of about 100 megabits-per-second.

30. The method of claim 20, wherein said charging base is a portable device freely positioned within an operating location of said television, wherein a system user selectively locates said charging base adjacent to a customary viewing location of said television to utilize said charging base without leaving said customary viewing location.

31. The method of claim 20, further comprising peripheral devices that bi-directionally communicate with said television and other external entities over said wireless communication link while said peripheral devices are docked to said charging base.

32. The method of claim 31, wherein said peripheral devices comprise one or more of: a video camera, a digital still camera, a personal computer device, a personal digital assistant, an audio player, and a cellular telephone.

33. The method of claim 31, wherein said charging base is coupled to an AC power source to provide a continuous source of recharging power for recharging said remote control and said peripheral devices.

34. The method of claim 31, wherein said charging base comprises a peripheral dataport/charger interface for docking said peripheral devices to said charging base, wherein a dataport/charger interface for said peripheral devices is implemented according to a Universal Serial Bus standard to facilitate compatibility with other electronic devices.

35. The method of claim 34, wherein a peripheral recharge power source is provided to recharge peripheral batteries of said peripheral devices through said peripheral dataport/charger interface when said peripheral devices are docked to said charging base.

36. The method of claim 31, wherein said peripheral devices upload content information to said television, a remote storage device, and an Internet server over said wireless base-TV communications link while coupled to said charging base.

37. The method of claim 31, wherein said peripheral devices download content information from said television, a remote storage device, and an Internet server over said wireless base-TV communication link when coupled to said charging base.

38. The method of claim 31, wherein said peripheral devices upload and download content information to and from said television, a remote storage device, and an Internet server over said wireless base-TV communication link when coupled to said charging base, wherein said content information comprises entertainment programming, video data, still image data, text data, software program instructions, graphics, movies, and electronic program guides.

39. The method of claim 26, wherein said electronic information comprises video content information that is displayed on a liquid-crystal display of said remote control.

40. A system for controlling an electronic system, the system comprising:
a television (TV) for displaying image data on a television display screen;
a remote control for controlling operations of said TV over a communication link; and
a charging base for generating an RC recharge power source to recharge battery of said remote control,
wherein said charging base is operable to serve as a communication interface for one or more peripheral devices to bi-directionally communicate with said TV over a wireless base-TV communication link when said one or more peripheral devices are physically docked to said charging base,
wherein said wireless base-TV communication link allows said charging base to be freely positioned with respect to said TV.

41. A system for controlling an electronic system, the system comprising:
a remotely-controllable device;

a remote control operable to control operations of said remotely-controllable device; and a charging base operable to generate a recharge power source to recharge said remote control, wherein said charging base is operable to serve as a communication interface for one or more peripheral devices to communicate directly with said remotely-controllable device over a wireless base-TV communication link when said one or more peripheral devices are physically docked to said charging base, wherein said wireless base-TV communication link allows said charging base to be freely positioned with respect to said remotely-controllable device.

42. The system of claim 41, wherein said remotely-controllable device comprises a television set-top box.

43. A system for charging a remote control device, the system comprising:

a remote control operable to control operations of a television (TV) over an RC-TV communication link;

a charging base operable to generate an RC recharge power source to recharge an RC battery of said remote control when said remote control is docked to said charging base, wherein said charging base is operable to serve as a communication interface for said remote control to bi-directionally communicate with said television over a wireless base-TV communication link to download electronic program guide data from said television into said remote control when said remote control is docked to said charging base, wherein said wireless base-TV communications link allows said charging base to be freely positioned with respect to said television; and a peripheral device dockable to said charging base for recharging a peripheral battery of said peripheral device, and wherein said peripheral device is operable to upload and download content information over said wireless base-TV communication link when docked to said charging base.

* * * * *